(12) United States Patent
Nadler (10) Patent No.: US 11,048,808 B2
(45) Date of Patent: Jun. 29, 2021

(54) CONSENT FOR COMMON PERSONAL INFORMATION

(71) Applicant: International Business Machines Corporation, Armonk, NY (US)

(72) Inventor: Sima Nadler, Kochav Yair (IL)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 16/396,721

(22) Filed: Apr. 28, 2019

(65) Prior Publication Data

US 2020/0342123 A1    Oct. 29, 2020

(51) Int. Cl.
  *G06F 21/60*  (2013.01)
  *G06F 21/62*  (2013.01)
  *H04L 29/06*  (2006.01)

(52) U.S. Cl.
  CPC ........ *G06F 21/604* (2013.01); *G06F 21/6245* (2013.01); *H04L 63/20* (2013.01)

(58) Field of Classification Search
  None
  See application file for complete search history.

(56) References Cited

U.S. PATENT DOCUMENTS

| 7,630,986 | B1 * | 12/2009 | Herz | G06Q 10/10 |
| 10,003,667 | B2 | 6/2018 | Mathew et al. | |
| 2011/0182420 | A1 | 7/2011 | Kramarz von Kohout | |
| 2014/0188991 | A1 | 7/2014 | Dhara et al. | |
| 2015/0025960 | A1 | 1/2015 | Gadamsetty et al. | |
| 2015/0154357 | A1 * | 6/2015 | Biswas | G16H 10/60 705/2 |
| 2015/0379303 | A1 * | 12/2015 | LaFever | G06F 21/6254 726/28 |
| 2016/0117523 | A1 | 4/2016 | Shaibal et al. | |
| 2017/0279786 | A1 | 9/2017 | Peterson et al. | |

OTHER PUBLICATIONS

International Search Report and Written Opinion, dated Jul. 24, 2020, from corresponding International Patent Application No. PCT/IB2020/053770, filed Apr. 21, 2020.

* cited by examiner

*Primary Examiner* — Brandon S Hoffman
(74) *Attorney, Agent, or Firm* — Gregory Kirsch (57) ABSTRACT

Embodiments may provide techniques that provide the capability to manage consent for access to personal data common to multiple people. For example, a method may comprise identifying data for which at least a portion of the data is common to a plurality of individuals or entities, determining a consensus level, for a purpose, of the individuals or entities to which the stored data is common, the consensus level being required for access to the data, transmitting a request for consent to the stored data to each of the plurality of individuals or entities, receiving responses to the requests for consent from at least some of the plurality of individuals or entities, determining a consensus score based on the received responses to the requests for consent, and allowing or denying access to the stored data based on the determined consensus score and on the required consensus level.

17 Claims, 7 Drawing Sheets

CONSENT FOR COMMON PERSONAL INFORMATION

BACKGROUND

The present invention relates to techniques that provide the capability to manage consent for access to personal data common to multiple people.

Sharing of personal information for certain purposes typically requires legal consent. For example, laws such as GDPR, HIPAA, and others, dictate that in order to use personal data for some purposes individuals must provide consent for the use of personal data. For example, a personal phone number may be used for providing support without consent, but not for marketing purposes.

However, some personal data is common to multiple people. for example, information about jointly owned property may include common information, such as home address, home phone number, etc., DNA information, a certain percentage of a person's DNA is the same as that of the person's ancestors, siblings, and children, information about family religious affiliation may include common information, such as family activities, vacation plans, vacation experiences, etc., multiple people appearing in a single picture, movie, audio recording, etc., and others. In this situation, when one person consents to the use of their information, they are, in essence, providing information associated with other persons, and making others identifiable as well, without the other person's consent. For example, if a person's sibling shares their DNA via Ancestry.com to find previously unknown relatives, those relatives will know they are related to the person as well as the sibling. Likewise, if a person posts about a great family vacation they're having, it may be clear to all observers that the person's spouse and children are present as well.

Currently, methods exist for collecting consent from a single individual, but not for managing consent for access to personal data common to multiple people. Accordingly, a need arises for techniques that provide the capability to manage consent for access to personal data common to multiple people.

SUMMARY

Embodiments of the present systems and methods may provide techniques that provide the capability to manage consent for access to personal data common to multiple people.

For example, in an embodiment, a method of controlling access to stored data may comprise identifying, at a computer system comprising a processor, memory accessible by the processor, and computer program instructions stored in the memory and executable by the processor, data for which at least a portion of the data is common to a plurality of individuals or entities, determining, at the computer system, a consensus level, for a purpose, of the individuals or entities to which the stored data is common, the consensus level being required for access to the data, transmitting, from the computer system, a request for consent to the stored data to each of the plurality of individuals or entities, receiving, at the computer system, responses to the requests for consent from at least some of the plurality of individuals or entities, determining, at the computer system, a consensus score based on the received responses to the requests for consent, and allowing or denying access to the stored data, at the computer system, based on the determined consensus score and on the required consensus level.

In embodiments, the stored data may be associated with purpose information indicating at least one purpose for which the stored data may be used. The stored data may be further associated with consensus policy information indicating at least one level of consent that is required for each associated purpose for which the stored data may be used. Each response to the request for consent may comprise a positive consent response or a negative consent response, each received response may be weighted based on relationship of the responding individual or entity to the stored data, and the consensus score may be determined based on the weighted responses and on the non-responses to the request for consent. The method may further comprise receiving, at the computer system, a request for access to the stored data. The method may further comprise transmitting, at the computer system, a response to the request for access to the stored data, the response based on whether access to the stored data was allowed or denied according to the consensus consent score. Access to the stored data may be denied by omitting the stored data from the response or by obfuscating stored data included in the response.

In an embodiment, a system for controlling access to stored data may comprise a processor, memory accessible by the processor, and computer program instructions stored in the memory and executable by the processor to perform: identifying data for which at least a portion of the data is common to a plurality of individuals or entities, determining a consensus level, for a purpose, of the individuals or entities to which the stored data is common, the consensus level being required for access to the data, transmitting a request for consent to the stored data to each of the plurality of individuals or entities, receiving responses to the requests for consent from at least some of the plurality of individuals or entities, determining a consensus score based on the received responses to the requests for consent, and allowing or denying access to the stored data based on the determined consensus score and on the required consensus level.

In an embodiment, a computer program product for controlling access to stored data may comprise a non-transitory computer readable storage having program instructions embodied therewith, the program instructions executable by a computer, to cause the computer to perform a method comprising: identifying data for which at least a portion of the data is common to a plurality of individuals or entities, determining a consensus level, for a purpose, of the individuals or entities to which the stored data is common, the consensus level being required for access to the data, transmitting a request for consent to the stored data to each of the plurality of individuals or entities, receiving responses to the requests for consent from at least some of the plurality of individuals or entities, determining a consensus score based on the received responses to the requests for consent, and allowing or denying access to the stored data based on the determined consensus score and on the required consensus level.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques that provide the capability to manage consent for access to personal data common to multiple people.

Figure 1:
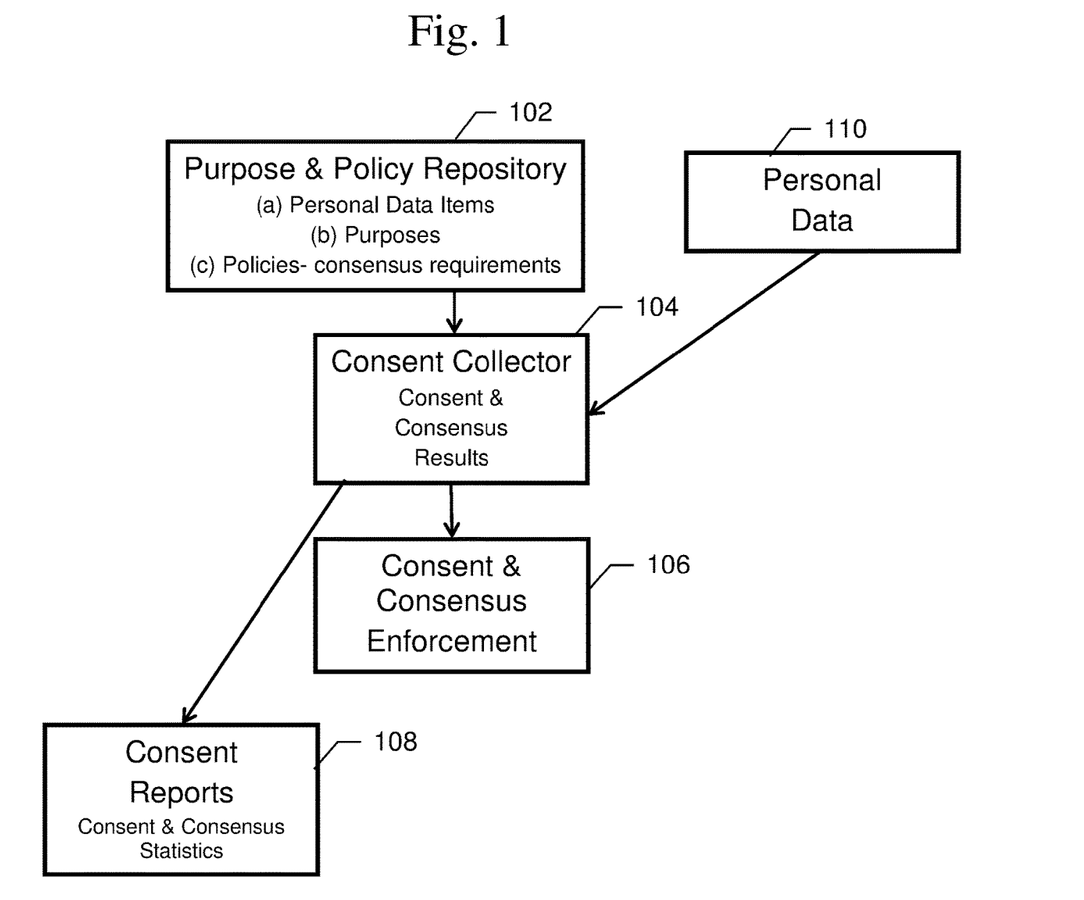
FIG. 1 illustrates an exemplary system according to embodiments of the present systems and methods.

An exemplary block diagram of a system 100, according to embodiments of the present techniques, is shown in FIG. 1. In this example, system 100 may include purpose and policy repository 102 which may include metadata about the personal data stored, for example, in personal data repository 110, and the processes and policies governing the personal data, consent collector block 104, consent and consensus enforcement block 106, and consent report block 108. Purpose and policy repository may include hardware, such as a computer system or data storage system, and/or software, such as may be implemented in a computer system or data storage system, to perform data catalog functions, such as storing personal data items, information relating to the purposes of the personal data items, and policies or consensus requirements. A schema for purpose and policy repository 102 may be configured during a system design phase. Consent collector block 104 may include hardware, such as a computer system or data storage system, and/or software, such as may be implemented in a computer system or data storage system, to perform collection of consent and consensus requirements and storage of consent and consensus results. Consent collector block 104 may actively collect consent and consensus during a system runtime. Consent and consensus enforcement block 106 may include hardware, such as a computer system or data storage system, and/or software, such as may be implemented in a computer system or data storage system, to perform enforcement of consent requirements in light of the collected consensus results. Consent and consensus enforcement block 106 may actively enforce consent and consensus policies during a system runtime and at times of other data usage. Consent report block 108 may include hardware, such as a computer system or data storage system, and/or software, such as may be implemented in a computer system or data storage system, to generate consent and consensus statistics based on the collected consensus results. Consent report block 108 may generate consent and consensus statistics during a post-processing compliance. Personal data repository 110 may store information relating to subjects, persons, entities, etc.

Figure 2:
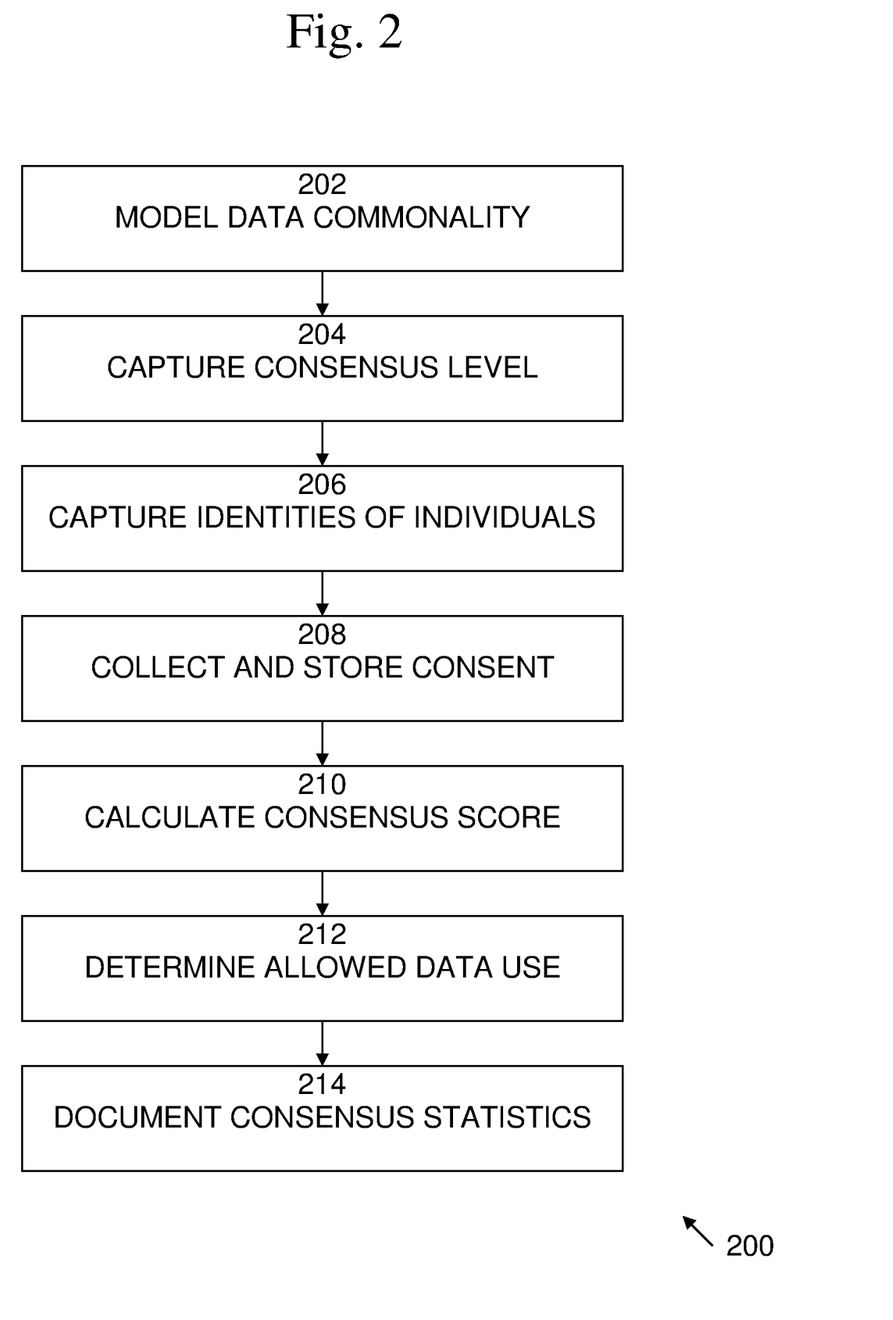
FIG. 2 is an exemplary data flow diagram of a process according to embodiments of the present systems and methods.

An exemplary flow diagram of a process 200, according to embodiments of the present techniques, is shown in FIG. 2. Process 200 begins with 202, in which it may modeled whether a certain type of personal data is common to other individuals, and whether the identity of the others sharing the data is inherently known, expressly known or declared, or inferred. At 204, the consensus level required for access to a particular type of data for a particular purpose may be captured. At 206, the identities of other individuals who share the same (or a subset) of the personal data may be captured. In embodiments, weights regarding the importance of each person's consent may be provided. For example, such weights may be based on how close a family member they are when sharing DNA. At 208, consent may be collected from other individuals sharing the same (or a subset) of a given person's personal data, and the collected consent information may be stored. In embodiments, collection of consent may be an iterative process, in which the decisions and reasons for the decisions of others is captured and shared. At 210, a consensus score for the personal data for a given purpose may be calculated. At 212, the allowed personal data uses may be determined, for example, by comparing the consent consensus score with a required consensus level. At 214, consensus statistics may be generated and reported.

Figure 3:
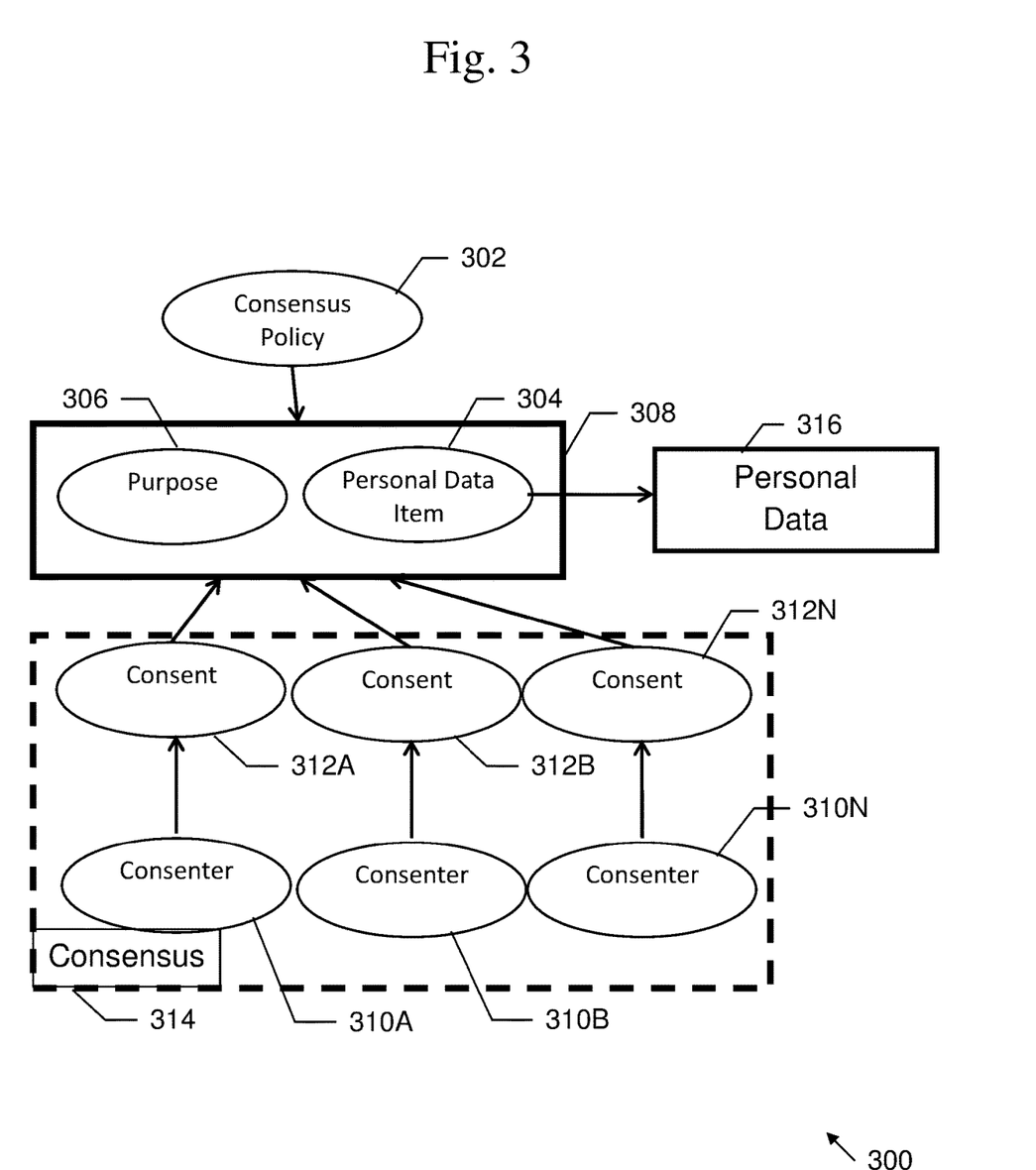
FIG. 3 is an exemplary block diagram of information items used in a process of modelling data commonality, according to embodiments of the present systems and methods.

An exemplary block diagram of information items 300 used in a process 202 of modelling data commonality, according to embodiments of the present techniques, is shown in FIG. 3. In this example, information items 300 may include one or more consensus policies 302, personal data item metadata 304, and associated purposes 306, which may be grouped and stored in a purpose and policy repository 308, consenters 310A-N, consent items 312A-N, consensus 314, and personal data repository 316.

Consensus Policy 302 may be information that specifies the levels of consensus required for access to a personal data item 304 for a specific purpose. Consensus Policy 302 may be defined such that for a pair including a purpose 306 and a personal data item 304 with a positive commonality flag, there is a policy that determines the level of consensus required in order to use the personal data for the specified purpose. For example, a required consensus level may be: High=90%, Medium=60%, Low=20%, which may indicate the percentage of data subjects whose common data being shared who must agree in order for the data to be used for the declared purpose. Typically, a consensus policy 302 may be entered by a privacy expert, an administrator, or other trusted user.

Personal Data Item 304 may refer to data associated with an identifiable person or entity, although it may not necessarily be unique to one and only one person. Personal Data Item 304 may refer to information attributes such as a name of the associated persons or entities, a description of the associated persons or entities, and may contain the technical location of such information, such as a database location, schema, table, etc., a commonality flag indicating whether this data may be common to other data subjects, sources of data for the identity and contact information for the associated persons or entities who may share the data item, and whether they are automatically discoverable or must be declared. Such sources may include, for example, a phone directory, family tree, club associations, etc. If there are different types of persons or entities who may share a particular data item, they may be weighted differently. For example, if the data item is a DNA profile, the weights applied to siblings may differ from those of cousins.

Purposes 306 may include information relating to or describing the use or uses to which personal data 304 may be put. Personal Data Items 304, which provide metadata about the actual persona information, which may be stored in personal data repository 316, and Purposes 306 may be grouped and stored in a purpose and policy repository 308. Consensus Policy 302 may be stored in the purpose and policy repository 308, or, as shown in the example of FIG. 3, input to data catalog 308. Consenters 310A-N may include data subjects, persons, or entities, whose personal data 304 is being used for a given purpose. Consent 312A-N may include an indication from each data subject (consenter 310A-N) that the consenter agrees that a specific type of personal data 304 of theirs may be used for a specific purpose. Consent may include information attributes such as a Consenter ID, a personal data item or items 304 to which the consent applies, purpose information 306 to which the consent applies, an indication of positive or negative consent, a date of the positive or negative consent, etc. Consensus 314 may include a requirement that when a particular personal data 304 (or a subset of the data) relates to more than one data subject, approval from multiple data subjects may be required. This requirement may be termed "consensus."

Figure 4:
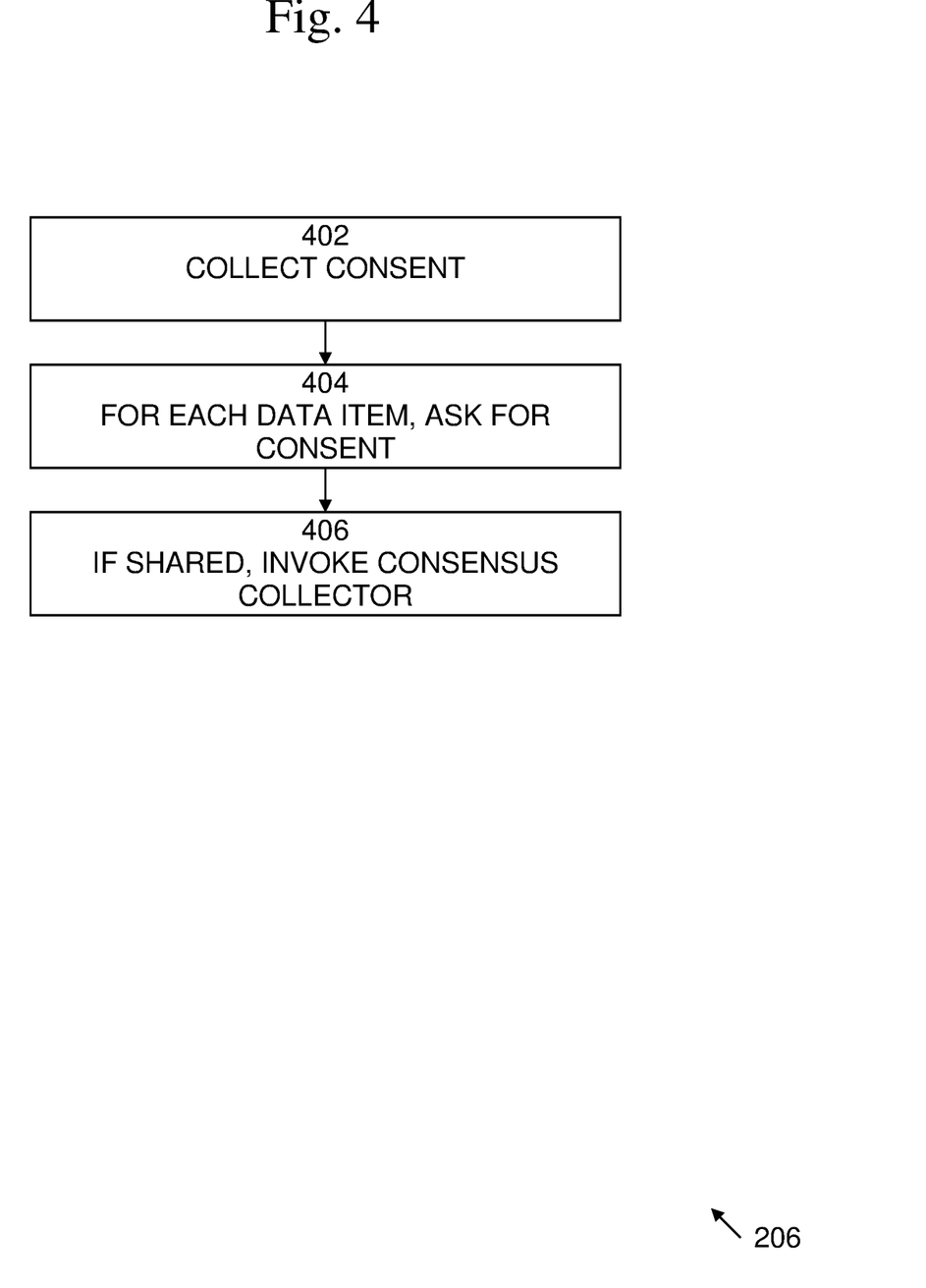
FIG. 4 is an exemplary flow diagram of a process of capturing identities of individuals, persons, and entities who share a data item, according to embodiments of the present systems and methods.

An exemplary flow diagram of a process of capturing identities of individuals, persons, and entities 206 who share data item, shown in FIG. 2, is shown in FIG. 4. At 402, consent for personal data for a particular purpose may be collected from Data Subject A. At 404, for each personal data item associated with the purpose, Data Subject A may be asked for consent. At 406, if the data item is shared, that is, if the personal data item commonality flag is true, the consent and consensus collector 104, shown in FIG. 1, may be invoked.

Figure 5:
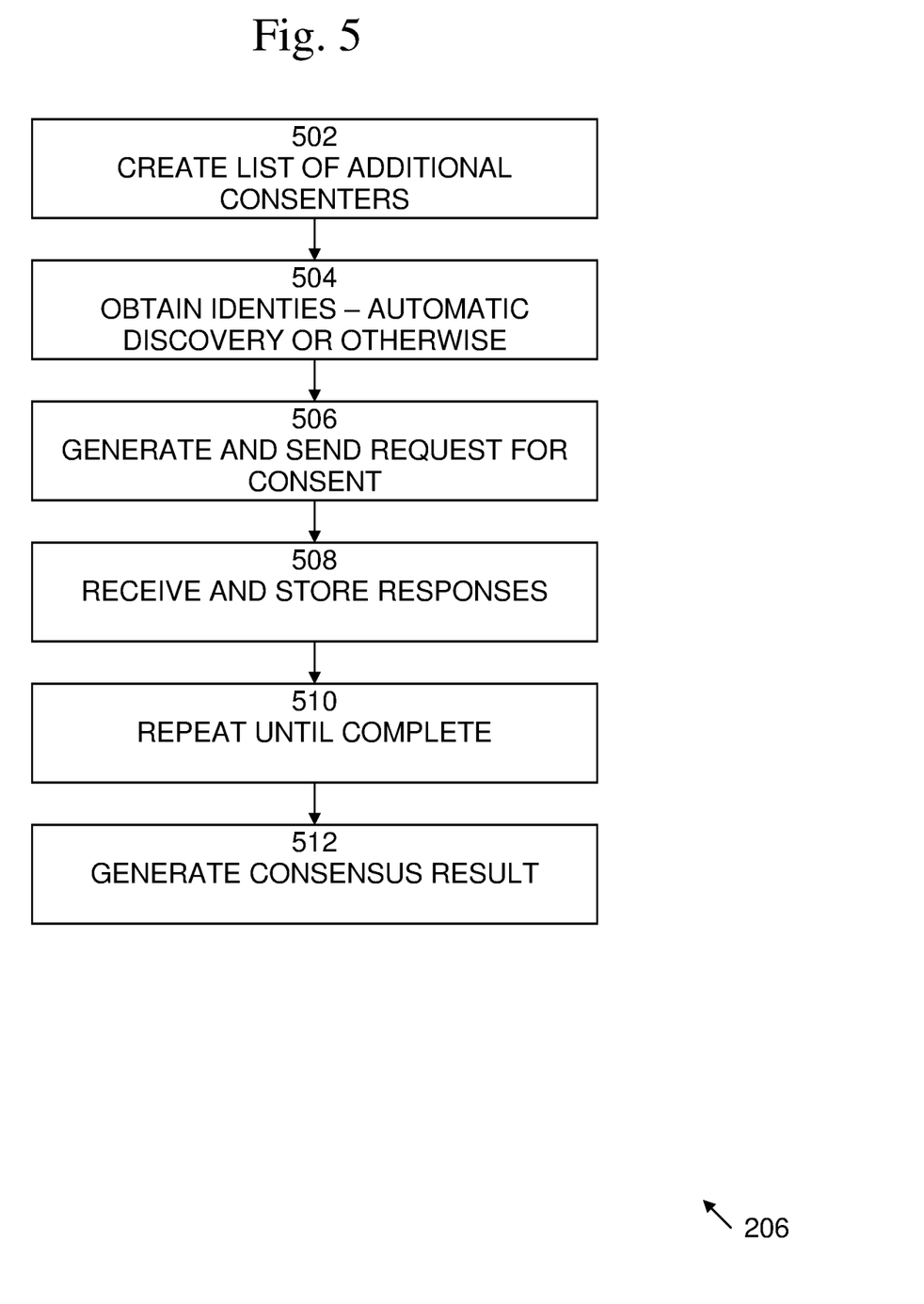
FIG. 5 is an exemplary flow diagram of a process of collecting and storing consent and calculating consensus score, according to embodiments of the present systems and methods.

An exemplary flow diagram of a process of collecting and storing consent 208 and calculating consensus score 210, shown in FIG. 2, is shown in FIG. 5. Processes 208 and 210 may be performed by consent and consensus collector 104, shown in FIG. 1. consent and consensus collector 104 may accept as input information such as the personal data item, identification of a person or entity related to the data item (termed Data Subject A), and an associated purpose. In the example shown in FIG. 1, the process begins with 502, in which, for each source in the personal data item, a list of additional consenters may be created. At 504, this list may be created by, for those data items for which the required consenters are automatically discoverable, searching for a relationship between Data Subject A and others related to the personal data item. For example, a query may be performed based on the street address of Data Subject A to find people other than Data Subject A who live at that address. Further examples may include relationships that may be derived from family trees, or by DNA analysis. For those data items for which the required consenters are not automatically discoverable, Data Subject A may be asked to provide the identities of others who should consent.

At 506, for each additional consenter, a request for consent may be generated and sent. The request may be generated by, for each additional consenter, retrieving policy information for the personal data item and the associated purpose to obtain information such as a Timeout (time limit for obtaining consent), a required consensus, such as a required consensus score, and required weights of different consenters. A request for consent may be sent to each additional consenter and their response or lack thereof may be tracked and stored. At 510, the sending of requests for consent and tracking and storing or responses and non-responses may be iterated multiple times until the process is complete. The process may complete by reaching the timeout in the policy, that is, the time limit for obtaining consent may be reached, or the process may complete when sufficient responses have been received to determine whether the required consensus, as indicated by the police, has been reached. At 512, the consensus result may be stored. The consensus result maybe the total of the weighted results of all consenters. For example, each consenter's result may be determined as: positive consent=1×consenter weight, negative consent or no answer=0. Then the consensus result=total of all consenters weighted results.

Figure 6:
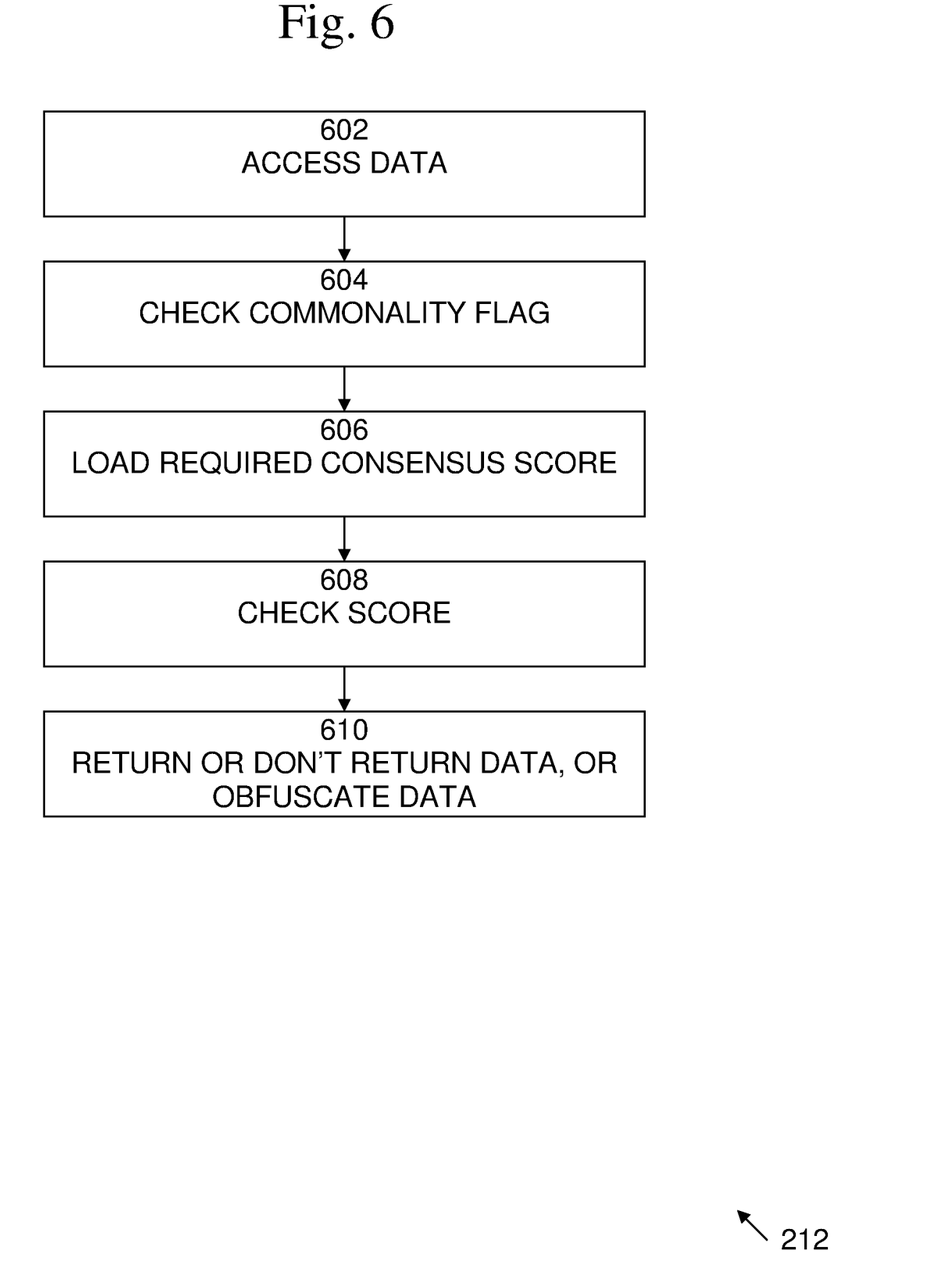
FIG. 6 is an exemplary flow diagram of a process of determining allowed data use, according to embodiments of the present systems and methods.

An exemplary flow diagram of a process of determining allowed data use 212, shown in FIG. 2, is shown in FIG. 6. Process 212 may be performed by consent and consensus enforcement block 106, shown in FIG. 1. Allowed data use may be determined in response to receiving a query for access 602 to a set of data to be used for a specified purpose (termed Purpose A). At 604, for each personal data item returned in the data set belonging to a person or entity (termed Data Subject B), it may be determined if the personal data item (from purpose and policy repository 102, shown in FIG. 1) has a positive commonality flag. If so, then at 606, the consensus score required for the personal data item for Purpose A and Data Subject B may be retrieved. At 608, the stored consent and consensus information may be accessed to see if the consensus score that includes Data Subject B is greater than or equal to the consensus score required by the policy. At 610, if the consensus score is greater than or equal to the consensus score required by the policy, the personal data item may be included as part of the data set responsive to the query. If the consensus score is not greater than or equal to the consensus score required by the policy, the personal data item may be omitted from the data set or may be obfuscated (altered such that it is not possible to identify any of the related data subjects).

Figure 7:
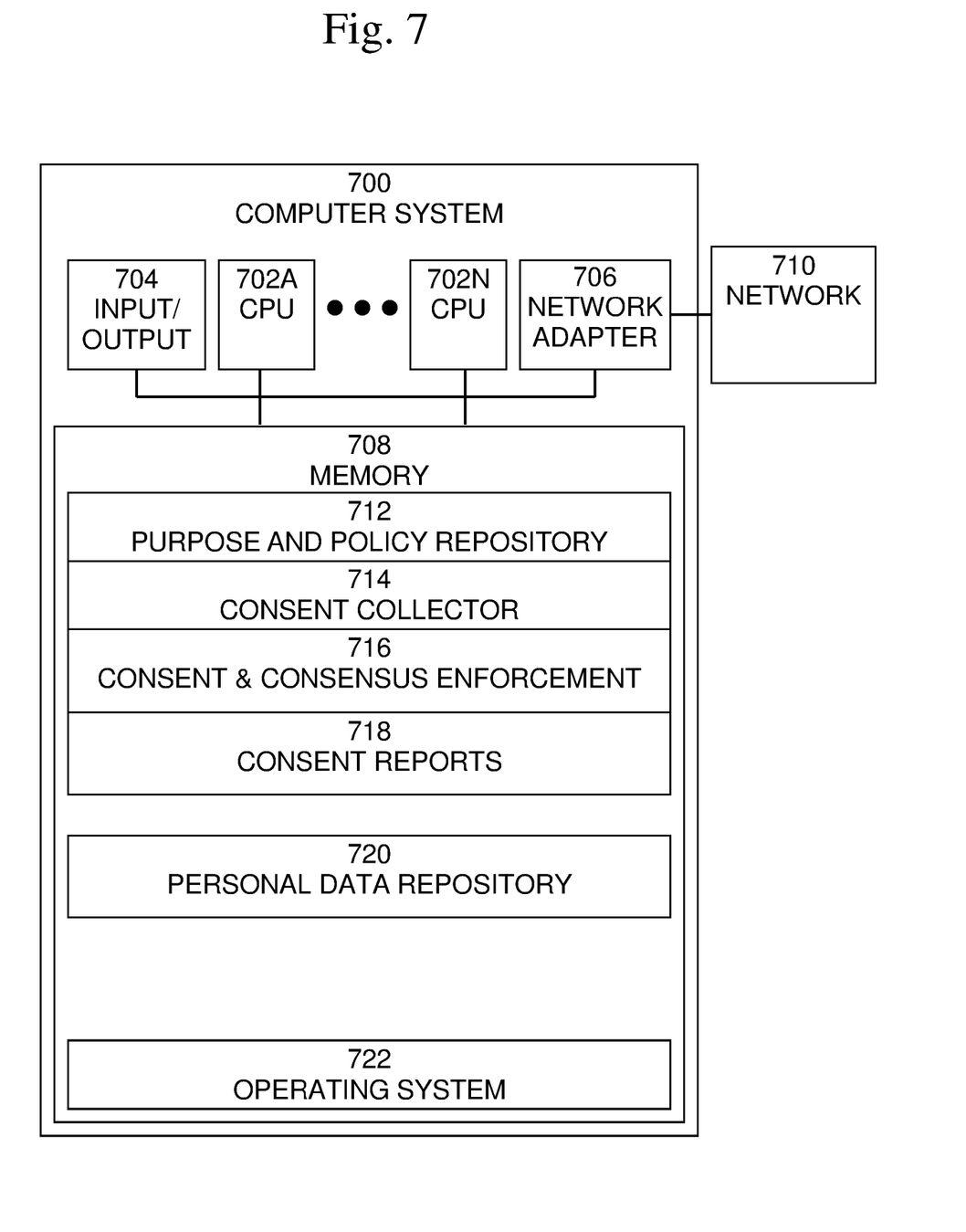
FIG. 7 is an exemplary block diagram of a computer system, in which processes involved in the embodiments described herein may be implemented.

An exemplary block diagram of a computer system 700, in which processes involved in the embodiments described herein may be implemented, is shown in FIG. 7. Computer system 702 may be implemented using one or more programmed general-purpose computer systems, such as embedded processors, systems on a chip, personal computers, workstations, server systems, and minicomputers or mainframe computers, or in distributed, networked computing environments. Computer system 702 may include one or more processors (CPUs) 702A-702N, input/output circuitry 704, network adapter 706, and memory 708. CPUs 702A-702N execute program instructions in order to carry out the functions of the present communications systems and methods. Typically, CPUs 702A-702N are one or more microprocessors, such as an INTEL CORE® processor. FIG. 7 illustrates an embodiment in which computer system 702 is implemented as a single multi-processor computer system, in which multiple processors 702A-702N share system resources, such as memory 708, input/output circuitry 704, and network adapter 706. However, the present communications systems and methods also include embodiments in which computer system 702 is implemented as a plurality of networked computer systems, which may be single-processor computer systems, multi-processor computer systems, or a mix thereof.

Input/output circuitry 704 provides the capability to input data to, or output data from, computer system 702. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 706 interfaces device 700 with a network 710. Network 710 may be any public or proprietary LAN or WAN, including, but not limited to the Internet.

Memory 708 stores program instructions that are executed by, and data that are used and processed by, CPU 702 to perform the functions of computer system 702. Memory 708 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 708 may vary depending upon the function that computer system 702 is programmed to perform. In the example shown in FIG. 7, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 7, memory 708 may include purpose and policy repository 712, consent collector 714, consent and consensus enforcement 716, consent reports 718, personal data repository 720, and operating system 722. Data catalog 712 may include software routines and data to perform data catalog functions, such as storing personal data items, information relating to the purposes of the personal data items, and policies or consensus requirements. Consent collector 714, may include software routines and data to perform collection of consent and consensus information and storage of consent and consensus results. Consent and consensus enforcement 716 may include software routines and data to perform enforcement of consent requirements in light of the collected consensus results. Consent reports 718 may include software routines and data to generate consent and consensus statistics based on the collected consensus results. Personal data repository 720 may store information relating to subjects, persons, entities, etc. Operating system 722 may provide overall system functionality.

As shown in FIG. 7, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of controlling access to stored data comprising:
    identifying, at a computer system comprising a processor, memory accessible by the processor, and computer program instructions stored in the memory and executable by the processor, data for which at least a portion of the data is common to a plurality of individuals or entities;
    determining, at the computer system, a consensus level, for a purpose, of the individuals or entities to which the stored data is common, the consensus level being required for access to the data;
    transmitting, from the computer system, a request for consent to the stored data to each of the plurality of individuals or entities;
    receiving, at the computer system, responses to the requests for consent from at least some of the plurality of individuals or entities;
    determining, at the computer system, a consensus score based on the received responses to the requests for consent, wherein each response to the request for consent comprises a positive consent response or a negative consent response, each received response is weighted based on relationship of the responding individual or entity to the stored data, and the consensus score is determined based on the weighted responses and on the non-responses to the request for consent; and
    allowing or denying access to the stored data, at the computer system, based on the determined consensus score and on the required consensus level.

2. The method of claim 1, wherein the stored data is associated with purpose information indicating at least one purpose for which the stored data may be used.

3. The method of claim 2, wherein the stored data is further associated with consensus policy information indicating at least one level of consent that is required for each associated purpose for which the stored data may be used.

4. The method of claim 1, further comprising receiving, at the computer system, a request for access to the stored data.

5. The method of claim 4, further comprising:
    transmitting, at the computer system, a response to the request for access to the stored data, the response based on whether access to the stored data was allowed or denied according to the consensus consent score.

6. The method of claim 5, wherein access to the stored data is denied by omitting the stored data from the response or by obfuscating stored data included in the response.

7. A system for controlling access to stored data, the system comprising a processor, memory accessible by the processor, and computer program instructions stored in the memory and executable by the processor to perform:
   identifying data for which at least a portion of the data is common to a plurality of individuals or entities;
   determining a consensus level, for a purpose, of the individuals or entities to which the stored data is common, the consensus level being required for access to the data;
   transmitting a request for consent to the stored data to each of the plurality of individuals or entities;
   receiving responses to the requests for consent from at least some of the plurality of individuals or entities;
   determining a consensus score based on the received responses to the requests for consent, wherein each response to the request for consent comprises a positive consent response or a negative consent response, each received response is weighted based on relationship of the responding individual or entity to the stored data, and the consensus score is determined based on the weighted responses and on the non-responses to the request for consent; and
   allowing or denying access to the stored data based on the determined consensus score and on the required consensus level.

8. The system of claim 7, wherein the stored data is associated with purpose information indicating at least one purpose for which the stored data may be used.

9. The system of claim 8, wherein the stored data is further associated with consensus policy information indicating at least one level of consent that is required for each associated purpose for which the stored data may be used.

10. The system of claim 7, further comprising receiving, at the computer system, a request for access to the stored data.

11. The system of claim 10, further comprising:
   transmitting, at the computer system a response to the request for access to the stored data, the response based on whether access to the stored data was allowed or denied according to the consensus consent score.

12. The system of claim 11, wherein access to the stored data is denied by omitting the stored data or by obfuscating the stored data.

13. A computer program product for controlling access to stored data, the computer program product comprising a non-transitory computer readable storage having program instructions embodied therewith, the program instructions executable by a computer, to cause the computer to perform a method comprising:
   identifying data for which at least a portion of the data is common to a plurality of individuals or entities;
   determining a consensus level, for a purpose, of the individuals or entities to which the stored data is common, the consensus level being required for access to the data;
   transmitting a request for consent to the stored data to each of the plurality of individuals or entities;
   receiving responses to the requests for consent from at least some of the plurality of individuals or entities, wherein each response to the request for consent comprises a positive consent response or a negative consent response, each received response is weighted based on relationship of the responding individual or entity to the stored data, and the consensus score is determined based on the weighted responses and on the non-responses to the request for consent;
   determining a consensus score based on the received responses to the requests for consent; and
   allowing or denying access to the stored data based on the determined consensus score and on the required consensus level.

14. The computer program product of claim 13, wherein the stored data is associated with purpose information indicating at least one purpose for which the stored data may be used.

15. The computer program product of claim 14, wherein the stored data is further associated with consensus policy information indicating at least one level of consent that is required for each associated purpose for which the stored data may be used.

16. The computer program product of claim 13, further comprising receiving, at the computer system, a request for access to the stored data.

17. The computer program product of claim 16, further comprising:
   transmitting, at the computer system a response to the request for access to the stored data, the response based on whether access to the stored data was allowed or denied according to the consensus consent score, wherein access to the stored data is denied by omitting the stored data or by obfuscating the stored data.

* * * * *